United States Patent Office 2,735,395
Patented Feb. 21, 1956

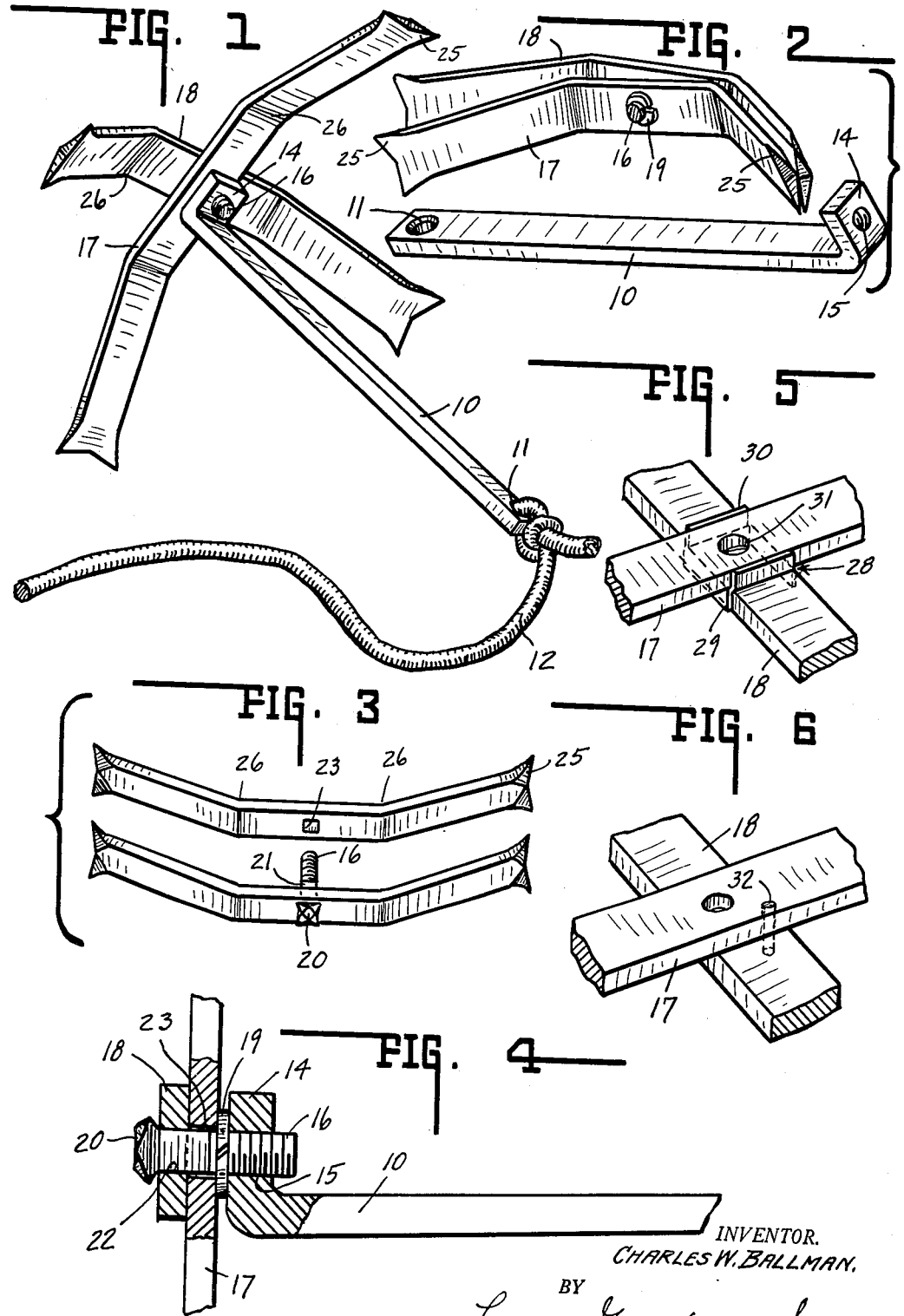

2,735,395
COLLAPSIBLE ANCHOR

Charles W. Ballman, Indianapolis, Ind.

Application January 29, 1953, Serial No. 334,061

1 Claim. (Cl. 114—207)

This invention relates generally to anchors and more particularly to light, collapsible anchors especially adapted for use in anchoring small boats.

There is a great variety of relatively light anchors which have been devised for anchoring small boats such as row boats, canoes and outboard motor boats. In particular, anchors in the nature of weights seem to be the most popular type for use in small boats, but in order for such anchors to have any holding power, they necessarily weigh from twenty-five to seventy-five pounds. Under many conditions even heavier anchors of this type do not have sufficient holding power, and they are rather awkward to handle, especially in the unstable smaller row boats and canoes.

Accordingly, it is the principal object of this invention to provide a light, collapsible anchor having a great amount of holding power in comparison to its weight.

In accordance with this invention there is provided a fabricated anchor consisting of a pair of fluke members disposed in crossed relation to one another and a shank having a base which may be bolted to the flukes at the point where they cross one another.

The full nature of the invention will be understood from the accompanying drawings and the following description and claim:

Fig. 1 is a perspective view illustrating the anchor in its assembled form as provided in accordance with this invention.

Fig. 2 illustrates the anchor shown in Fig. 1 in its collapsed position.

Fig. 3 is a perspective view showing the formation of the flukes of the anchor and their relationship to the bolt which secures the flukes and shank in assembled form.

Fig. 4 is an enlarged detail view partially in cross section illustrating the flukes, the bolt and the shank in assembled relation to one another.

Fig. 5 is an enlarged perspective detail of a modified apparatus for fastening the anchor flukes at right angles to one another.

Fig. 6 is an enlarged perspective detail view of another modification of an apparatus for fastening the anchor flukes at right angles to one another.

Referring to the drawings, the anchor provided in accordance with this invention comprises a shank 10 having an eye 11 at one end thereof for receiving an anchor line 12. The other end of shank 10 is bent at right angles to the main portion of the shank to form a base 14 which may be bored and threaded at 15 to receive a bolt 16. The anchor further comprises a pair of fluke members 17 and 18, of generally uniform width throughout their entire lengths, mounted at right angles to one another on bolt 16 and clamped thereby to the base 14 by means of bolt 16. In order to lock the flukes to the stock 10, there is provided a lock washer 19 on bolt 16 between fluke 17 and base 14 of the shank.

In order to prevent the flukes 17 and 18 from rotating relatively to one another, bolt 16 is provided with a head 20 and a square portion 21. Bolt 16 may be permanently mounted within fluke 18 by welding thereto or by dimensioning bolt 16 to have a drive fit with respect to the walls of aperture 22 in fluke 18. Fluke 17 may be provided with a square aperture 23 whereby it may be mounted on bolt 16 in a position illustrated in Fig. 1 or 2. If the anchor is being assembled for use, the flukes should be mounted in crossed relation to one another, as shown in Fig. 1. Or if the anchor is being assembled in collapsed position for storage or transportation, then the flukes may be assembled as shown in Fig. 2. When assembling the anchor for use it is merely necessary to place the flukes in crossed relation to one another with fluke 17 mounted on bolt 16 as shown in Fig. 1, and to screw the base 14 of shank 10 on bolt 16 until the lock washer 19 is compressed as shown in Fig. 4, at which time the flukes and the shank are locked together so that there can be no relative rotation between them.

Each of the flukes 17 and 18 terminates at its extremities in a plane generally at right angles to the axis thereof to form corners 25 which are flattend at their extremities so that each corner 25 is formed into a point. Each point lies at a divergent angle with respect to the longitudinal axis of the respective fluke, as shown in Figs. 1, 2 and 3. This formation of the end portions of the flukes enhances the holding characteristics of the anchor and causes the ends of the flukes to grab the bottom whether it be mud, gravel or rocks. It should be noted that the holding ability of the anchor is further enhanced by the bends 26 to either side of the center portions of the flukes. By bending the flukes in this manner, the outer ends thereof are tilted at the proper angle when engaging the bottom to provide maximum holding power.

Fig. 5 illustrates a modified apparatus for fastening the anchor flukes at right angles to one another, which apparatus comprises a member 28 having a pair of downwardly turned flanges 29 for receiving and locating fluke 18, and a pair of upwardly turned ears 30 for receiving and locating fluke 17. A conventional bolt (not shown) may be inserted through aperture 31 for securing the flukes to one another.

Fig. 6 illustrates another apparatus for securing the flukes at right angles to one another, which comprises a pin 32 which may be fixed to the fluke 18 by providing a drilled hole therein of such diameter that pin 32 fits with a drive fit. The fluke 17 may be bored to provide a hole having a relatively loose fit with respect to pin 32 so that fluke 17 may be placed over the pin 32 and secured to fluke 18 by means of a conventional bolt (not shown).

From the foregoing description it will be apparent that the anchor provided by this invention may be of light construction and still have maximum holding power. For example, the flukes may be formed of strap iron approximately one quarter inch by one and one eighth inches. The shank may be approximately eleven inches long being formed of bar stock approximately one inch wide and three eighths inch thick. Furthermore, the anchor is collapsible and can be stored and transported with maximum convenience. Because of the dimensional and collapsible characteristics of the anchor provided by this invention, it is possible to provide an anchor having a weight of three pounds and having also more than adequate holding power to anchor safely smaller boats such as row boats, canoes and outboard motor boats.

The invention claimed is:

An anchor comprising a pair of crossed flukes, said flukes being of generally uniform width throughout their entire lengths and the extremities of said flukes each terminating in a plane generally at right angles to the axis of the fluke, thereby forming corners, the corners of each fluke being flattened to form points, each point lying at a divergent angle with respect to the longitudinal axis of the respective fluke, a member connecting said flukes for holding them in crossed relation to one another, and a shank mounted on said flukes at the crossed portion thereof.

References Cited in the file of this patent

UNITED STATES PATENTS

| | | |
|---|---|---|
| 177,492 | Francis | May 16, 1876 |
| 2,526,214 | Faraone | Oct. 17, 1950 |

FOREIGN PATENTS

| | | |
|---|---|---|
| 967,838 | France | Apr. 5, 1950 |